(12) United States Patent
Swanson et al.

(10) Patent No.: US 10,824,985 B2
(45) Date of Patent: Nov. 3, 2020

(54) INTERACTIVE MOBILE PICK-UP UNIT NOTIFICATION

(71) Applicant: Amazon Technologies, Inc., Seattle, WA (US)

(72) Inventors: Katie Swanson, Seattle, WA (US); Nathan Kyle Newsom, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 609 days.

(21) Appl. No.: 15/065,673

(22) Filed: Mar. 9, 2016

(65) Prior Publication Data

US 2017/0262802 A1   Sep. 14, 2017

(51) Int. Cl.
G06Q 10/08 (2012.01)
G06Q 30/06 (2012.01)
H04W 4/029 (2018.01)
H04W 4/02 (2018.01)

(52) U.S. Cl.
CPC ..... *G06Q 10/0836* (2013.01); *G06Q 10/0833* (2013.01); *G06Q 30/0639* (2013.01); *G06Q 30/0641* (2013.01); *H04W 4/02* (2013.01); *H04W 4/029* (2018.02)

(58) Field of Classification Search
CPC .......... G06Q 10/0836; G06Q 10/0833; G06Q 30/0639; G06Q 30/0641; H04W 4/029; H04W 4/02
USPC ........................................................ 705/339
See application file for complete search history.

(56) References Cited

U.S. PATENT DOCUMENTS

| 8,239,130 B1 * | 8/2012 | Upstill ............... G01C 21/3679 701/426 |
| 8,457,557 B2 * | 6/2013 | Alden ................. H04L 63/0492 455/41.2 |
| 9,060,248 B1 | 6/2015 | Coulombe et al. |
| 9,494,938 B1 * | 11/2016 | Kemler ............... G05D 1/0088 |
| 2006/0027042 A1 | 2/2006 | Sato |
| 2007/0150375 A1 * | 6/2007 | Yang ..................... G06Q 30/06 705/339 |
| 2010/0073201 A1 | 3/2010 | Holcomb et al. |

(Continued)

FOREIGN PATENT DOCUMENTS

GB   2528818 A  *  2/2016  ............. G07F 17/12

OTHER PUBLICATIONS

Kessler, Sarah; "5 Mobile Apps for Finding Food Trucks in Your Area" 2011 (Year: 2011).*

(Continued)

*Primary Examiner* — Kevin H Flynn
*Assistant Examiner* — Dione N. Simpson
(74) *Attorney, Agent, or Firm* — Lee & Hayes, P.C.

(57) ABSTRACT

Techniques for providing details associated with an item for acquisition from a pick-up unit are described herein. In particular implementations, a service provider may determine whether a mobile device is within a predetermined distance from the pick-up unit. In some implementations, a companion application may allow a user of the mobile device to cause a sensory function at the pick-up unit when the mobile device is within the predetermined distance. For instance, the user may use the companion application to cause the pick-up unit to produce light, sounds, smoke, bubbles, among other operations.

20 Claims, 7 Drawing Sheets

(56) References Cited

U.S. PATENT DOCUMENTS

| | | | |
|---|---|---|---|
| 2010/0114488 A1* | 5/2010 | Khamharn | B60R 25/102 |
| | | | 701/300 |
| 2012/0030133 A1* | 2/2012 | Rademaker | G06Q 10/08 |
| | | | 705/333 |
| 2015/0245168 A1 | 8/2015 | Martin | |
| 2016/0014220 A1 | 1/2016 | Kim | |
| 2016/0155281 A1* | 6/2016 | O'Toole | G07C 9/00182 |
| | | | 340/5.64 |

OTHER PUBLICATIONS

PCT Invitation to Pay Additional Fees dated Apr. 19, 2017 for PCT application No. PCT/US2017/019060, 11 pages.
PCT Search Report and Written Opinion dated Jun. 22, 2017 for PCT application No. PCT/US2017/019060, 16 pages.

* cited by examiner

INTERACTIVE MOBILE PICK-UP UNIT NOTIFICATION

BACKGROUND

Service providers often publish their locations on a map so that potential customers can find them. In some cases, service providers may be mobile. In that case, locations of the service providers may be tracked and updated on the map as the service providers' locations change. Thus, potential customers can track the location of the service providers on the map in order to determine where to find them to obtain service. However, once the potential customer is in the general vicinity of a desired service provider, it may be difficult to locate the service provider's exact location. This may be due to a non-descript nature of a mobile service provider, due to limited accuracy or resolution of commercially available location tracking systems, inaccuracies in determined location due to obstructions or interference, and/or latency in tracking and displaying the service provider's location.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
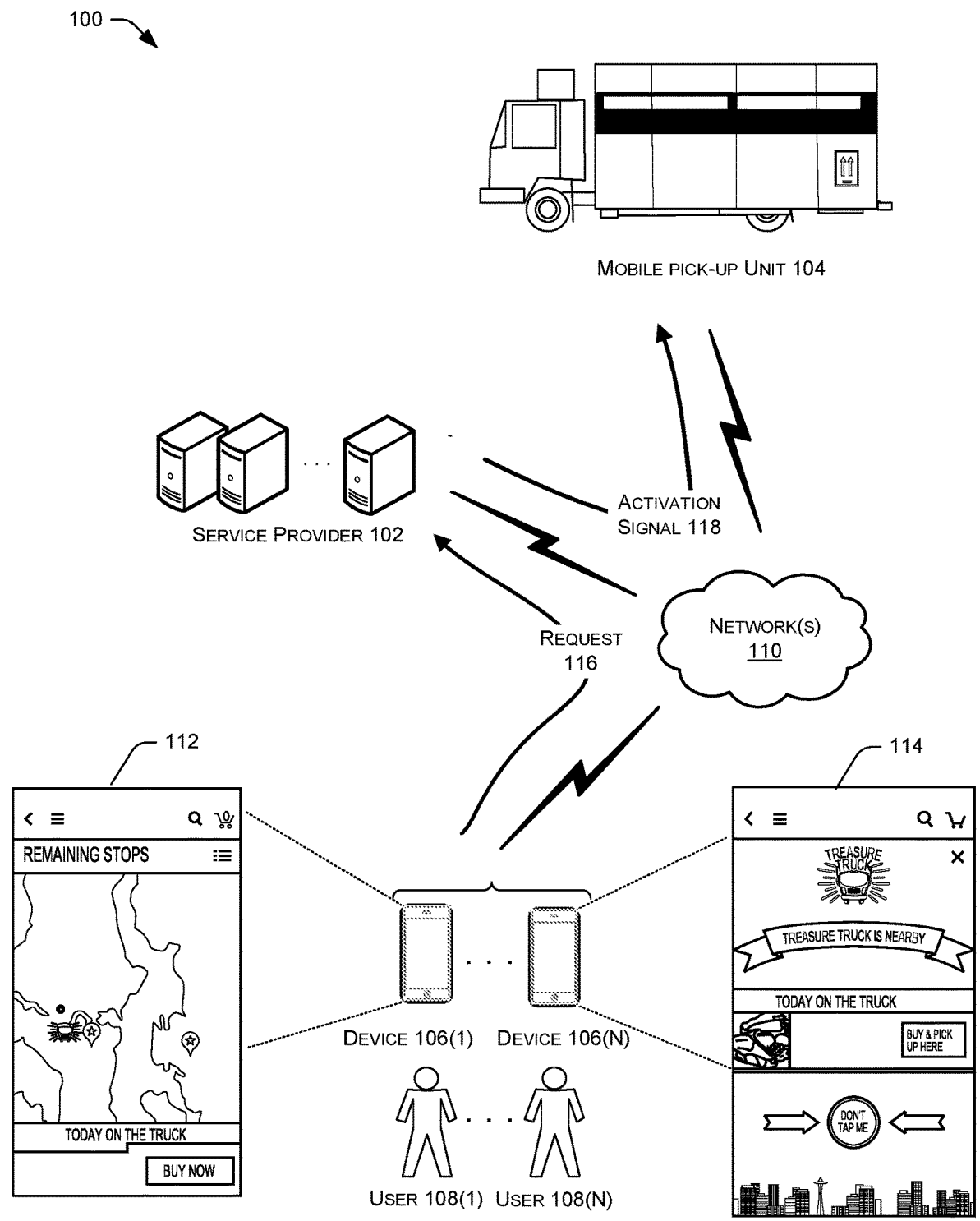
FIG. 1 illustrates an example architecture associated with items for acquisition at a mobile pick-up unit from a service provider.

This disclosure describes techniques directed, in part, to a service provider to define a physical location of a pick-up unit and to allow interaction with the pick-up unit when a mobile device associated with a user is within a threshold distance to the location of the pick-up unit. In some implementations, the service provider may update an appearance of a graphical representation or icon representing the pick-up unit on a user interface displayed on the mobile device based on the proximity of the user's mobile device to the pick-up unit. The service provider may allow the user to interact with the pick-up unit via the user interface by selecting an interactive control. Interaction with the pick-up unit may be enabled when the user's mobile device is determined to be within a relatively close proximity to the pick-up unit. In some implementations, the service provider may cause the pick-up unit to produce an audio, visual, or other sensory output responsive to selection of the icon or other control of the interface. In some instances, this sensory output may aid the user in locating the pick-up unit once the user is in relatively close proximity to the pick-up unit (e.g., to locate the pick-up unit on a crowded street or parking lot).

In some implementations, the pick-up unit may comprise a motor vehicle (e.g., a truck, van, car, trailer, or the like) or other mobile pick-up unit containing one or more items offered for acquisition associated with a service provider, such as an online merchant or "brick and mortar" retailer. In some examples, the item(s) may be offered for a particular time period (e.g., hours, a day, a week) and/or offered at a discounted price. The mobile pick-up unit may move or be moved between one or more predetermined locations within a particular geographic region during the time period. For instance, the mobile pick-up unit may be scheduled to be at a first street address during a first time of day and at a second street address at a second time of day. In some implementations, one or more fixed pick-up units may be used in addition to or instead of mobile pick-up units. In that case, each fixed pick-up unit may be fixed at a particular physical location where items are available for a specific periods of time. Examples of fixed pick-up locations may include brick and mortar stores, kiosks, and the like.

In some implementations, the service provider may provide a companion application or website for a user to access information associated with the pick-up units (e.g., mobile and/or fixed pick-up units). The companion application or website may include graphical representations or icons representing the pick-up units. For example, in some implementation, when the mobile device associated with the user is outside a predetermined distance of a location of the pick-up unit, the icon representing the pick-up unit may be presented by the service provider in a first state. When the mobile device associated with a user is determined to be within a predetermined distance of a location of the pick-up unit, the icon representing the pick-up unit may be presented by the service provider in a second state.

In some implementations, the service provider provides the icon in the second state to notify the user that additional functionality (e.g., interactivity with the pick-up unit) is active and/or available. Furthermore, the user may activate the additional functionality of the pick-up unit via a selection of an interactive control shown on a user interface presented by the service provider in the companion application or website to manipulate one or more features of the pick-up unit. For instance, the additional functionality may include a sensory function, such as producing sound(s), emitting light(s), emitting smoke, activating a bubble machine, and/or activating a motor or actuator to move parts of the pick-up unit.

In some implementations, the service provider may receive a request from a user to provide notifications to a mobile device associated with the user regarding items available for acquisition from a pick-up unit. The notification may include information about a current item offered for acquisition at a pick-up unit, a location at which the item(s) are currently available for acquisition from a pick-up unit, and/or location(s) at which the item(s) will be available for acquisition from a pick-up unit in the future. As part of the request, the service provider may also receive consent to obtain location information of the mobile device of the user. The location information indicates that the user has enabled the service to utilize global positioning systems, Bluetooth, Wi-Fi hotspots, and/or or cellular tower locations of the user's cellular service to determine an approximate location of the mobile device associated with the user.

For instance, the service provider may receive an initial consent from a user when the user elects to receive notifications from the service provider regarding the pick-up unit. Additionally or alternatively, the service provider may obtain consent to obtain location information when the user activates the companion application or website. In some examples, the service provider may obtain location information from another publicly available source of location information (e.g., a location-based social networking service), other information obtained with the explicit consent of the user, and/or other information that has been processed to remove identifying information (e.g., names, addresses, etc.). Furthermore, in other implementations, a user may navigate directly to a landing page within the companion application or website dedicated to the pick-up unit without enabling the notification services described above. In that case, the companion application or website may display locations of the pick-up units without regard to a current location of the mobile device.

The user may navigate to the landing page within the companion application or website by, for example, selecting a link or other control in the notification or by opening the companion application and navigating to the landing page. The landing page may include details about the item for acquisition currently available from the pick-up unit. For instance, the landing page may include an image of the item, a textual description of the item, a cost of the item, and/or a quantity limit of the item. Furthermore, the landing page may also include a textual listing of the one or more locations of the pick-up unit(s) at which the item can be acquired during predetermined periods of time (e.g., day, week, etc.). As used herein, the term "item" refers to a physical product, a digital product or download (e.g., a user may receive an e-book download or digital music download at the pick-up unit), gift certificate, or a service.

In some implementations, the landing page includes a list view control usable to cause presentation of a list view page of the remaining one or more locations of the pick-up unit. The list view page may include an address of each remaining location at which the item(s) may be acquired from a pick-up unit and a time of day during which the item(s) may be acquired at each location. Additionally or alternatively, the companion application or website may include a map view control to cause presentation of a map view page illustrating a map of a specific geographic area. The map view page may include an icon showing a location of a pick-up unit at which the item(s) can currently be acquired and icons showing one or more locations of pick-up units at which item(s) will be acquirable in the future. As described above, if the user has opted in to allow tracking of the user's mobile device, the location of the user's mobile device may be displayed in the map view and an appearance of an icon on the map representing a location of a currently active pick-up unit (i.e., a pick-up unit from which the item can currently be acquired) may be updated depending on a location of the user's mobile device relative to the pick-up unit. For instance, the icon representing the location of the currently active pick-up unit may be updated depending a current proximity of the mobile device of the user to the pick-up unit. That is, when a user (via the associated mobile device) is detected within a predetermined distance (e.g., about 10 meters, about 20 meters, about 30 meters, about 10 yards, about 20 yards, about 30 yards, about 50 yards, about 2 street block, about 3 street blocks, etc.) of the pick-up unit, the service provider may update a presentation of the icon representing the location of the currently active pick-up unit on the map from a first state to a second state to indicate the user is near the pick-up unit. In some instances, the predetermined distance or proximity may be measured in terms of absolute distance (i.e., "as the crow flies"), while in other instances the distance may be measured in terms of travel distance of the user's mobile device to reach the mobile pick-up unit.

In some implementations, upon selection of the icon in the second state from the map view page, a proximity page may be presented by the service provider to appear on the companion application. In some implementations, the proximity page may include one or more interactive icons or other controls that, upon selection, may implement a functionality of the pick-up unit. For instance, selection of the interactive icon or control on the proximity page of the companion application or website may cause the mobile pick-up site to produce sound(s), emit light(s), emit smoke, activate a bubble machine, activate a motor to move parts of the pick-up unit, or perform other sensory functions. In some examples, selection of the interactive icon or control may cause a request to be sent from the user's mobile device to the service provider, requesting to actuate one more sensory functions of the pick-up unit. The request may or may not specify a particular sensory function of the pick-up unit to be actuated. Responsive to receiving the request from the mobile device, the service provider may send a command to the pick-up unit to actuate one more sensory functions of the pick-up unit.

This brief introduction is provided for the reader's convenience and is not intended to limit the scope of the claims. Furthermore, the techniques described in detail below may be implemented in a number of ways and in a number of contexts. One example implementation and context is provided with reference to the following figures, as described below in more detail. However, the following example implementation and context is but one of many.

Example Architecture

FIG. 1 illustrates an example architecture 100 usable by a service provider 102 to notify users of items offered for acquisition from one or more pick-up units. In the illustrated example, a mobile pick-up unit 104 is shown. However, the techniques described in this example are applicable to fixed and/or mobile pick-up units. In this example, the service provider 102 provides particular item(s) for acquisition and designates one or more predetermined locations and times at which a mobile pick-up unit 104 will be present for users to pick up the item(s). In some examples, the service provider 102 provides information about the item(s) available for acquisition, the scheduled locations and times of pick up, and other information via a companion application that can be installed on mobile devices 106(1)-(N) (collectively "mobile devices 106") of users 108(1)-(N) (collectively "users 108"). In other examples, the service provider 102 may provide such information via a website that is accessible via a browser of the mobile devices 106.

The service provider 102 may be hosted by one or more computing devices or servers and may communicate with the mobile pick-up unit 104, the mobile devices 106, or other computing devices or servers via one or more networks 110. The networks 110 may include wireless and/or wired networks, including mobile telephone networks, wide area networks (WANs), and so forth.

The service provider 102 may communicate with the one or more users, which may include users 108 using mobile devices 106, by sending notifications about the item(s) for acquisition at the mobile pick-up unit 104 for the current period of time and/or receiving inputs from the mobile devices 106 via the companion application. For instance, the service provider 102 may communicate with mobile devices 106 by providing the example user interfaces 112 and 114. As described in detail below, the user interfaces 112 and 114 include information to purchase the item(s) offered for acquisition and pick-up at the mobile pick-up unit 104, the current location of the mobile pick-up unit 104, future location(s) of the mobile pick-up unit 104, and/or an indication of the user's current proximity to the mobile pick-up unit 104.

The mobile devices 106 may include virtually any type of electronic device or computing device that can exchange information with another device. For example, the mobile devices 106 may be any one or more of mobile telephones, smart telephones, notebook computers, tablets, gaming consoles, desktop computers, music players, electronic book (eBook) reader devices, vehicle computing devices, kiosks, and/or other types of electronic devices. As described above, the service provider 102 may provide the notification and details associated with the mobile pick-up unit to the mobile devices 106 (or any other device) through the companion application. Additionally or alternatively, the service provider 102 may provide the information through a browser, a third party application, and/or through messaging services such as multimedia message service (MMS), email, and other messaging services. For instance, the users 108 may access a website of the service providers 102 with a desktop computer or vehicle computing devices to obtain the details associated with the mobile pick-up unit 104.

The service provider 102 may also communicate with the mobile pick-up unit 104 to determine a status of the mobile pick-up unit 104, tracking the current quantity of the item at the mobile pick-up unit 104, and/or sending instructions to the mobile pick-up unit 104 to implements a functionality of the mobile pick-up unit 104.

For instance, the service provider 102 may determine that the mobile device 106(1) of user 108(1) is within a threshold distance of the mobile pick-up unit 104. Additionally, the service provider 102 may receive a request 116 from the mobile device 106(1) of user 108(1) to implement a functionality of the mobile pick-up unit 104. In some implementations, the service provide 102 may receive the request and send an activation signal 118 to the mobile pick-up unit 104 to cause the mobile pick-up unit 104 to implement that requested functionality. In some instance, the request 116 and the activation signal may be sent via the network(s) 110.

Example Computing Architecture

Figure 2:
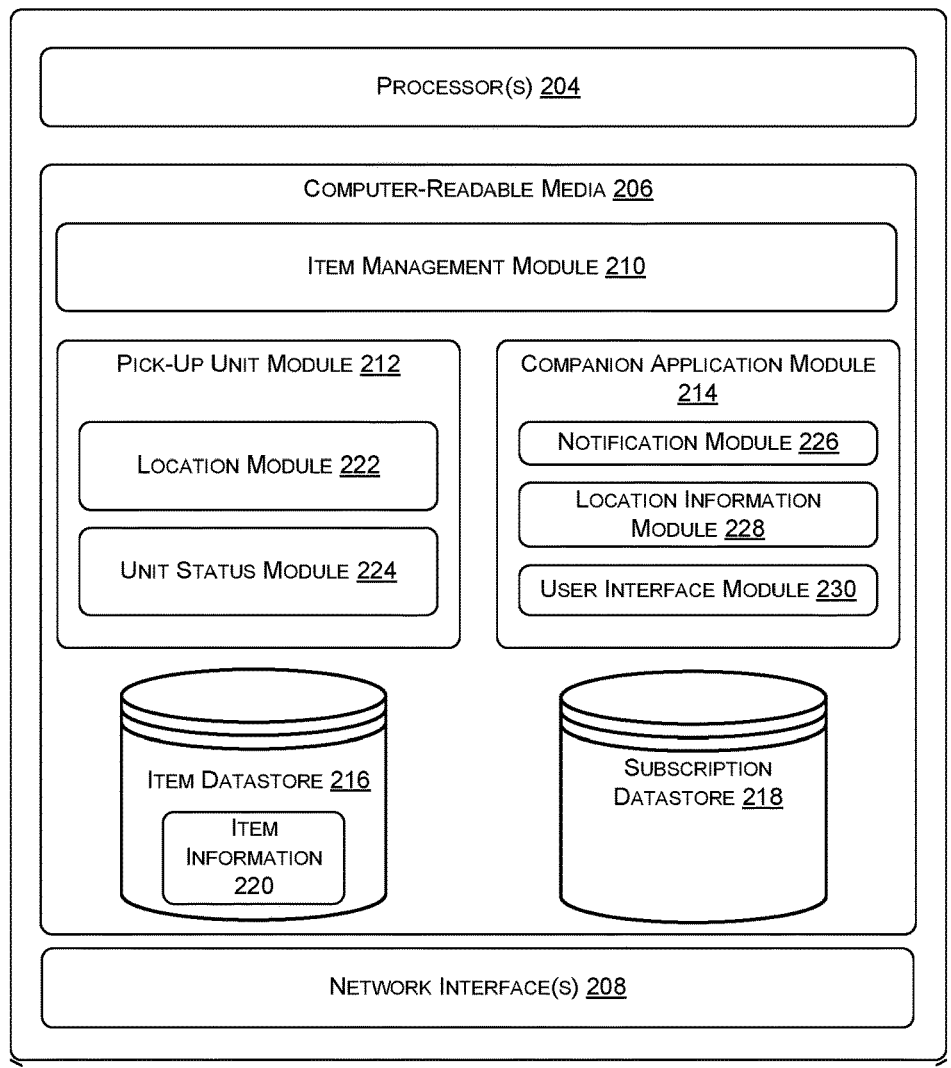
FIG. 2 illustrates details of one or more example computing devices of the service provider of FIG. 1.
Figure 2:
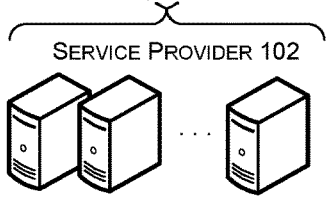

FIG. 2 shows a block diagram of an illustrative computing architecture 200 to provide notifications regarding the item for acquisition at the mobile pick-up unit 104 and/or provide one or more user interfaces (such as user interfaces 112 and 114) of the companion application of the service provider 102. The computing architecture 200 may include one or more computing devices 202 that may be implemented in a distributed or non-distributed computing environment.

The computing devices 202 may include one or more processors 204 and one or more computer-readable media 206 that stores various modules, applications, programs, or other data. The computer-readable media 206 may include instructions that, when executed by the one or more processors 204, cause the processors to perform the operations described herein for the service provider 102. The computing devices may also include one or more network interfaces 208 to allow communication between the service provider 102 and the mobile pick-up unit 104 and or between the service provider 102 via the companion application and a mobile device (such as one of mobile devices 106) of a user.

The network interfaces 208 may support both wired and wireless connection to various networks, such as cellular networks, radio, Wi-Fi networks, short range networks (e.g., Bluetooth®), infrared (IR), and so forth.

Implementations may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, implementations may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some implementations, the computer-readable media 206 may store an item management module 210, a pick-up unit module 212, and a companion application module 214. In some implementations, one or more datastores may be included in the computing architecture 200, accessible by the computing device 202. The one or more datastores may include an item datastore 216 and a subscription datastore 218.

In some implementations, the item management module 210 may identify one or more items offered by the service provider 102 for pick-up at a location of the mobile pick-up unit 104. In some implementations, the item management module 210 may access the item datastore 216 and the item information 220 for each item in the item datastore to determine the one or more items for sale and/or pick-up at the location of the mobile pick-up unit 104.

As mentioned above, the computer-readable media 206 may also store a pick-up unit module 212. The pick-up unit module 212 may include the locations module 222 to store location information associated with the mobile pick-up unit 104. For instance, the location module 222 may store one or more predetermined physical geographic locations (e.g., street addresses or GPS coordinates) for the mobile pick-up unit 104 for a predetermined time period (e.g., day, week, etc.). In some implementations, the location module 222 may store information associated a perimeter around each of the one or more predetermined locations of the mobile pick-up unit 104. For instance, the perimeter may comprise a geo-fence or a virtual perimeter around a predetermined location of the mobile pick-up unit. The virtual perimeter may have a radius of 20 yards, 30 yards, 50 yards, from at least 15 yards to about 50 yard, 2 street blocks, etc. around the predetermined location (such global positioning system coordinates or a street address) of the mobile pick-up unit 104. Example techniques for establishing a geographic parameter are described in application Ser. No. 14/853,152, entitled "Techniques for Dynamic Geographic Fencing," the entity of which is incorporated by reference. In other examples, the perimeter may comprise an estimated time to arrival at the mobile pick-up site, a measured signal strength, or other location-based perimeter. As described above, aspects of the user interfaces of the companion application or website are altered based on determining that a mobile device of a user is within the perimeter.

In some implementations and as described below, the location module 222 of the pick-up unit module 212 may communicate with one or more modules of the companion application module 214 in order to determine a location of the mobile device of the user relative to one or more of the predetermined physical geographic locations (e.g., street addresses or GPS coordinates) of the mobile pick-up unit 104.

In some implementations, the pick-up unit module 212 includes a unit status module 224 to receive information regarding the status of the mobile pick-up site 104. For instance, the unit status module 224 may request and/or receive information about the current functionality or status of auxiliary units (e.g., auxiliary lights, speakers, smoke machine, etc.) of the mobile pick-up unit 104. In some implementations, the unit status module 224 may communicate with the companion application module 214 or receive a request (such as request 116 from mobile device 106(1) of user 108(1)) of to provide instructions to the mobile pick-up unit 104 to implement the functionality.

The computer-readable media 206 may also store a companion application module 214 to control the features of companion application. For instance, the companion application module 214 may communicate, via the network interface(s) 208, inputs received from the mobile device of a user using a particular interface of the companion application to the mobile pick-up unit 104. In other implementations, as described above, the companion application may allow the user to purchase the item offered at the mobile pick-up unit 104. FIG. 2 shows that the companion application module 214 may include a notification module 226, a location information module 228, and a user interface module 230.

The notification module 226 may provide notification to the mobile devices of the users. For instance, the notification module 226 may gather item information for the item management module 210 to create a notification to send, via network interface(s) 208, to the mobile devices of users. In some instance, the notification module 228 may access the subscription datastore 218 to determine which users have enable notifications associated with the mobile pick-up unit on the companion application.

The location information module 228 may determine or access geographical location information associated with the mobile device operating the companion application. Furthermore, the location information module 228 may access the subscription datastore 218 to determine that the user has given consent to allowing the service provider 102 to obtain the location information. In some implementations, the determined geographical location information may allow the user to receive the notifications from the notification module 226. For instance, the notifications provided by the service provider 102 regarding the mobile pick-up unit 104 may only be provided to user within a predetermined geographical distance from the pick-up unit (e.g., 10 miles, 100 miles, etc.) or may only be provided to user who live in specific zip codes.

Furthermore, as described above, the location information may allow the location information module 228 to determine the physical proximity (or distance between) of the mobile device of the user to the mobile pick-up unit 104. In some implementations, the location information may allow the module 228 to determine whether the mobile device is within the perimeter of the geo-fence around the mobile pick-up unit 104.

The user interface module 230 of the companion application module 214 may generate multiple user interfaces for presentation on the mobile devices of the user. For instance, the user interface module 230 may alter an icon representing the predetermined location of the mobile pick-up unit 104 based on the location information of the mobile device of the user gathered by the location information module 228. Furthermore, once the icon is altered, the user interface module 230 may receive inputs or selections on the user interface presenting the icon. These inputs may be to manipulate or initiate a visual, audible, and/or other sensory feature associated with the mobile pick-up unit 104.

In some implementations, the inputs on the user interface to manipulate the features associated with the mobile pick-up unit 104 may be available to a limited set of users. Additionally or alternatively, an additional input may be present on the user interface to manipulate the features associated with the mobile pick-up unit 104 based on details associated with the user. For instance, the companion application module 214 may access the subscription datastore 218 to determine whether the user is a first-time user, a frequent purchaser, a paid subscriber, or the like. In some implementations, the companion application module 214 may make an extra feature or a feature not available to all users of the mobile pick-up unit 104 available to the user based on this determination.

In some implementations, the user interface module 230 may communicate with the item management module 210 and the pick-up unit module 212 to generate user interfaces including item details of the particular item(s) available for pick-up at the mobile pick-up unit 104 and/or user interfaces including information of a current and future locations of the mobile pick-up unit 104.

Figure 3:
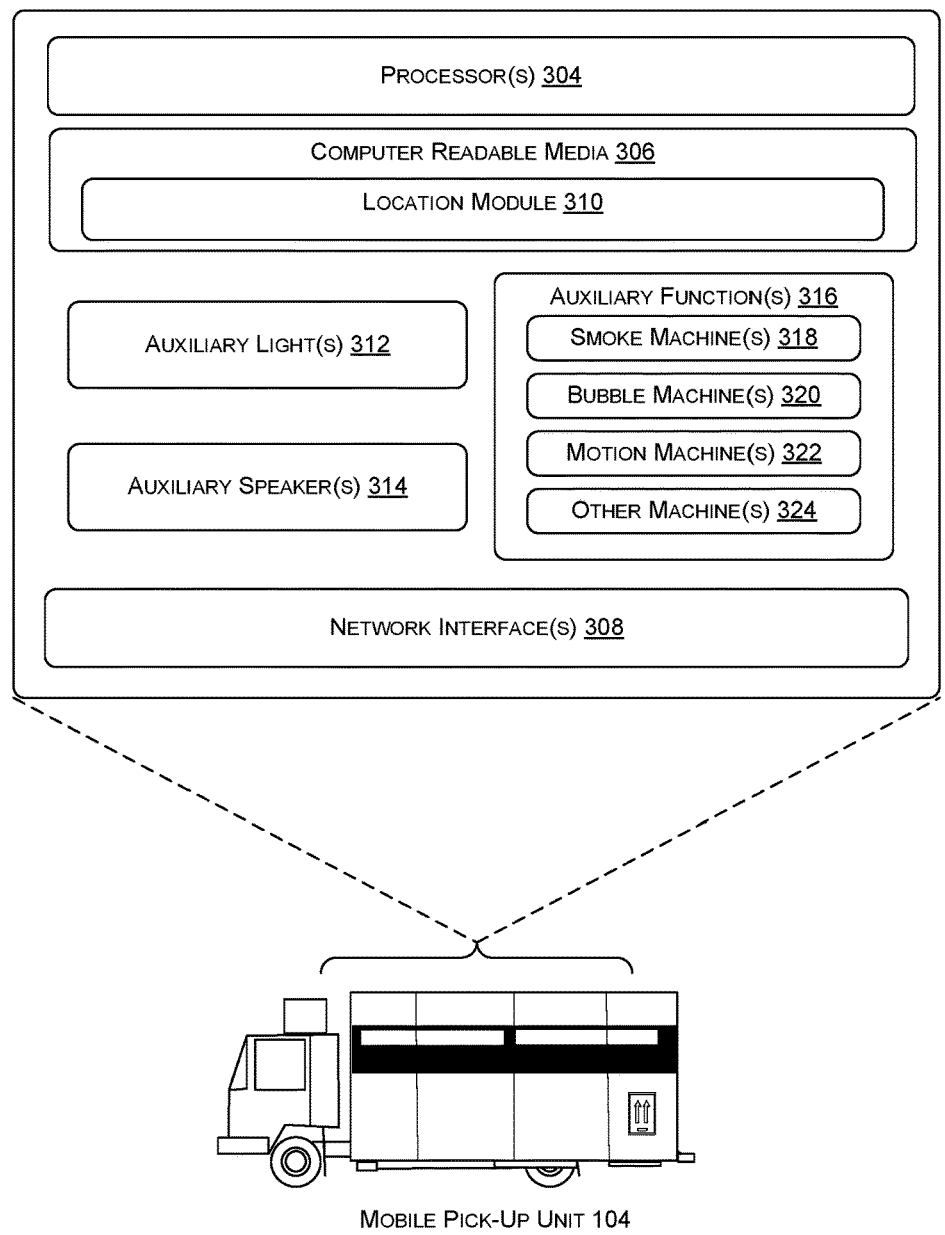
FIG. 3 illustrates details of the example mobile pick-up unit of FIG. 1.

FIG. 3 shows a block diagram of an illustrative computing architecture 300 and other features of an example mobile pick-up unit 104. As shown in FIG. 3, the mobile pick-up unit 104 is illustrated as a motor vehicle such as a van, box truck or any other vehicle. In some implementation, the mobile pick-up unit 104 may be manned, unmanned, or an autonomous vehicle. That is, the mobile pick-up unit 104 may be capable of sensing the driving environment and navigating without human input. In other implementations, the mobile pick-up unit 104 may be implemented by other type of vehicles such as drone aircraft or the like.

In some implementations, the mobile pick-up unit 104 may provide location information (e.g. GPS coordinates or street address) to computing devices 202 of the service provider 102. Furthermore, the mobile pick-up unit 104 may receive instructions (such as activation signal 118) from the computing devices 202 of the service provider 102 to initiate a visual, audible, and/or other sensory feature associated with the mobile pick-up unit 104.

In some implementations, the mobile pick-up unit 104 may include one or more processors 304 and one or more computer-readable media 306 that stores various modules, applications, programs, or other data. The computer-readable media 306 may include instructions that, when executed by the one or more processors 304, cause the processors to perform the operations described herein for the mobile pick-up unit 104. Similar to the computing devices described above, the mobile pick-up unit 104 may also include one or more network interfaces 308 to allow communication between the mobile pick-up unit 104 and the computing devices 202 of the service provider 102 and/or between the mobile pick-up unit 104 and a mobile device (such as one of mobile devices 106) of a user or an electronic device of an operator of the mobile pick-up unit 104.

As described above, a control signal indicating a selection by the user on a user interface presented on a mobile device is received by the computing devices 202 of the service provider 102. In some implementations, the computing devices 202 of the service provider 102 may communicate with modules stored by one or more computer-readable media 306 of the mobile pick-up unit 104 to initiate the visual, audible, and/or other sensory feature associated with the mobile pick-up unit 104.

In some implementations, the computer-readable media 306 may store an item location module 310 to provide confirmation that the mobile pick-up unit 104 is at one of the predetermined geographical locations. For instance, the location module 310 may provide, via network interface(s) 308, GPS coordinates or a nearest physical street address to the location module 222 of the pick-up unit module 212. As described above, the location module 222 may determine a geo-fence or other perimeter around the GPS coordinates or the nearest physical street address of the mobile pick-up unit 104. In other implementations, the location module 310 may generate its own perimeter based on the information gathered by the location module 310. In this instance, the location module 310 may provide the perimeter information to the computing devices 202 of the service provider 102.

The mobile pick-up unit 104 may also include auxiliary light(s) 312, auxiliary speaker(s) 314, and other auxiliary functions 316. As described above, the auxiliary light(s) 312, auxiliary speaker(s) 314, and other auxiliary functions 316 may provide a visual, audible, or other sensory feedback to a user. Furthermore, as described above, a user may initiate the auxiliary light(s) 312, auxiliary speaker(s) 314, and other auxiliary functions 316 of the mobile pick-up unit 104 via a user interface on the companion application when the user is within a threshold distance of the mobile pick-up unit 104. In some implementations, the auxiliary light(s) 312, auxiliary speaker(s) 314, and other auxiliary functions 316 of the mobile pick-up unit 104 may be initiated by a physical interaction between a user and the mobile pick-up unit 104.

The auxiliary light(s) 312 may include flashing lights, strobe lights, sequential lighting, spot lights, color lights, or any other type of lights. The auxiliary speakers(s) may provide any type of sounds such as spoken words and/or sound effects. In some implementations, the sounds produced by the auxiliary speaker(s) 314 may be based on a particular item at the mobile pick-up unit 104 for the particular period of time. For instance, if the item is a chef knife set, the sound produced by the auxiliary speaker(s) 314 may be a sound associated with a chefs knife being sharpened on a sharpening steel.

The other auxiliary functions 316 may include smoke machine(s) 318, bubble machine(s) 320, motion machine(s) 322, and/or other machine(s) 324. In some implementations, the motion machine(s) 322 may produce a movement of parts of the motor vehicle. For instance, the motion machine(s) 322 may cause movement of rotating sign giving an appearance of salmon pumping out of water. In some implementations, the other machine(s) 324 may include machines that produce an olfactory sensation. For instance, if the item is a chocolate chip cookie, the other machine(s) 324 may produce a smell similar to a fresh baked chocolate chip cookie.

In some implementations, a type or level of functionality requested by the user may be based on the proximity of the mobile device to the mobile pick-up unit 104. For instance, the auxiliary light(s) 312 and/or auxiliary speaker(s) 314 may be activated when the mobile device of the user is at a first range within the perimeter of the mobile pick-up unit 104 while one or more of the other auxiliary function 316 may be activated when the mobile device of the user is at a second range within the perimeter of the mobile pick-up unit 104.

Example Interfaces

Figure 4:
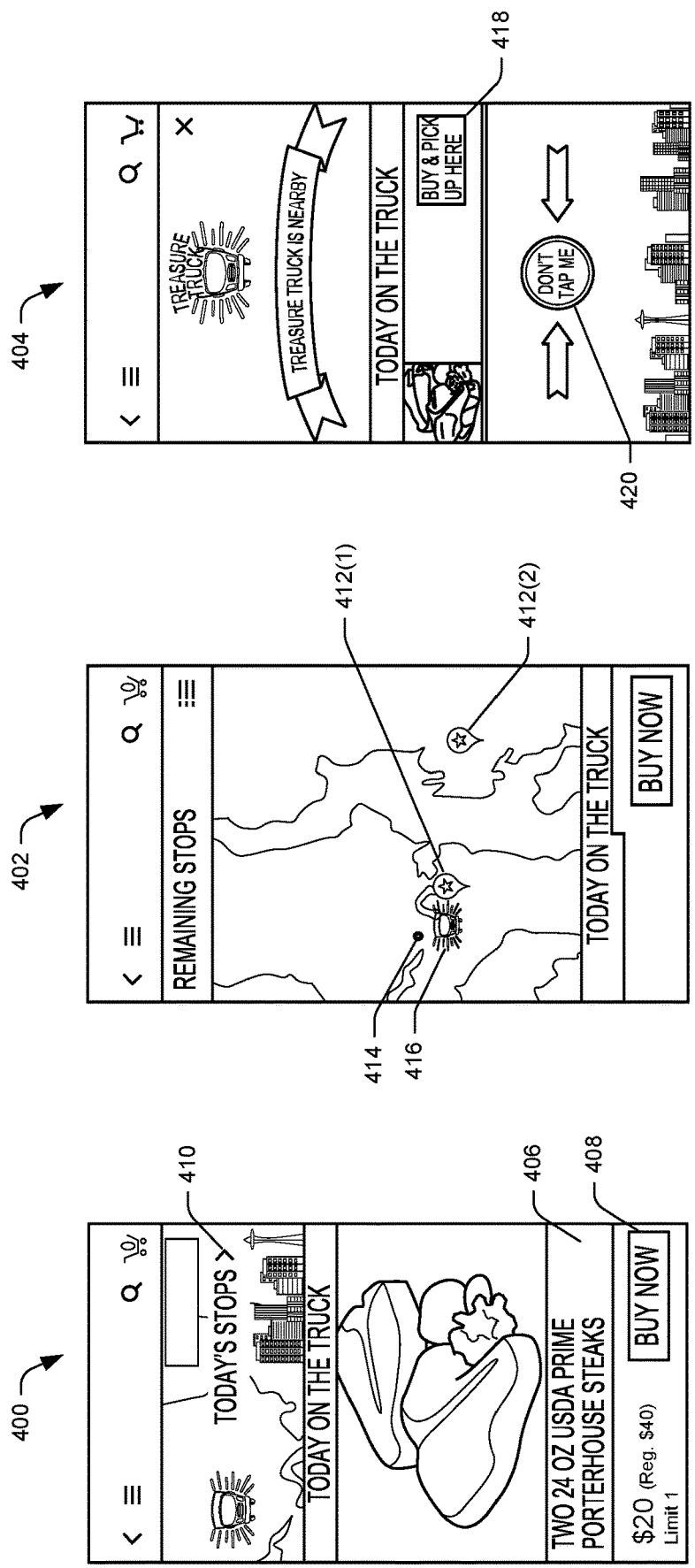
FIG. 4 illustrates an example sequence of user interfaces that may be provided by a service provider to manipulate a feature of a mobile pick-up unit.
Figure 5:
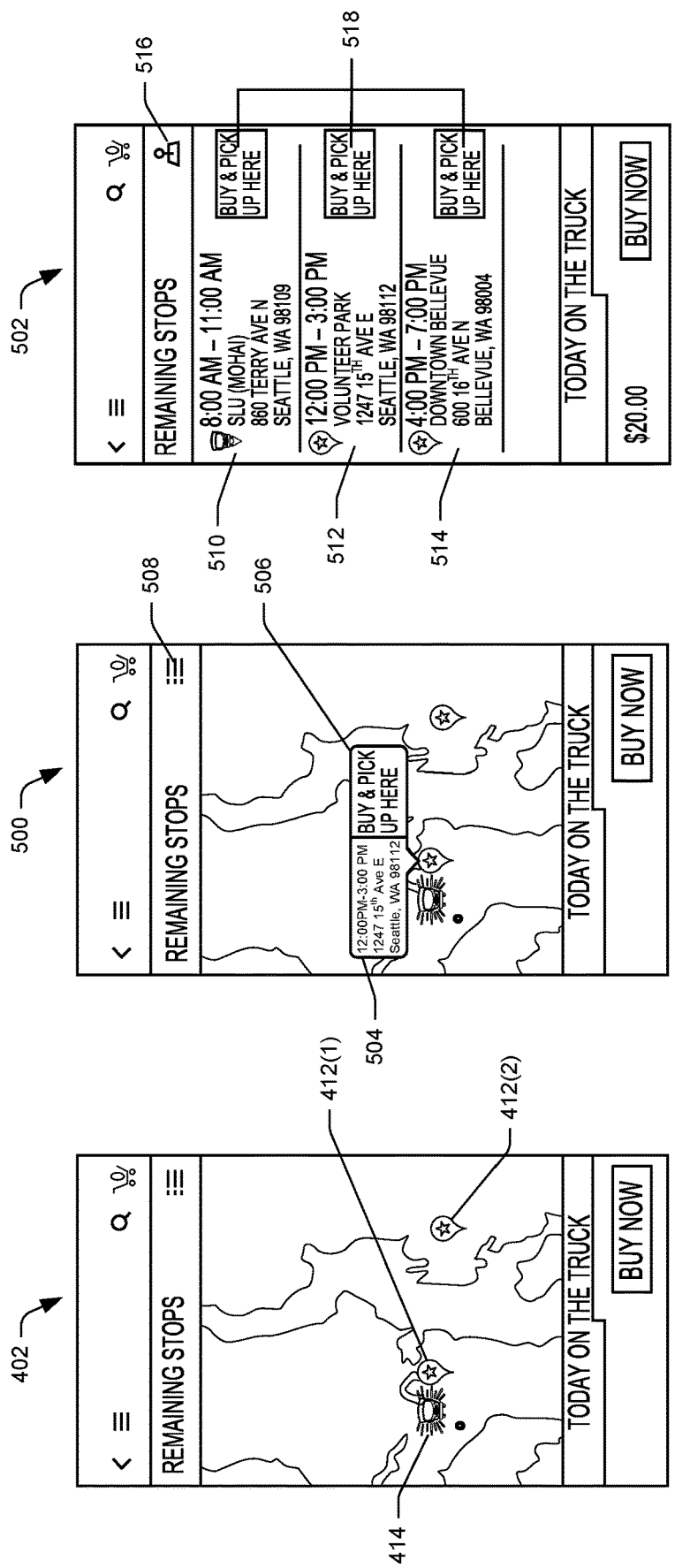
FIG. 5 illustrates an example sequence of user interfaces that may be provided by a service provider to indicate a proximity of a user device to a mobile pick-up unit.
Figure 6:
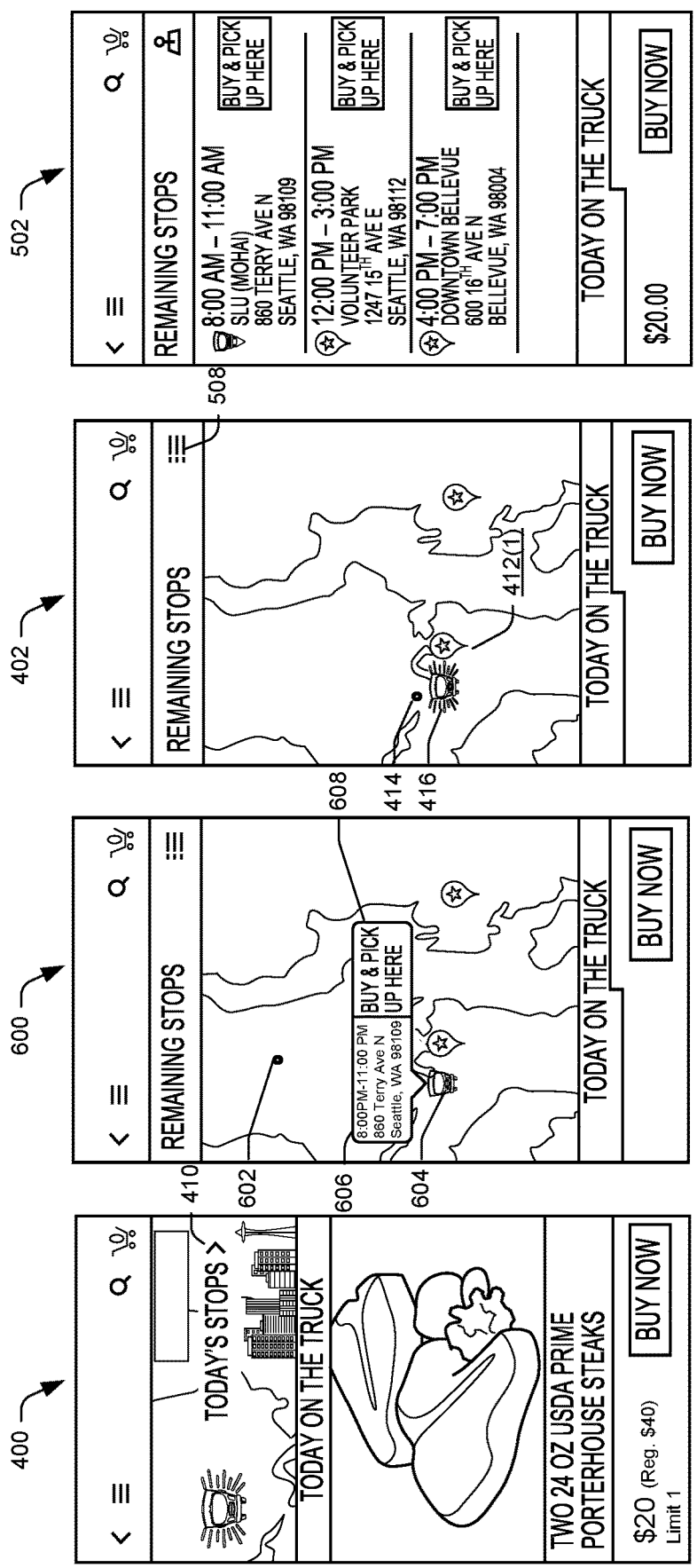
FIG. 6 illustrates an example sequence of user interfaces that may be provided by a service provider to indicate a change in proximity of a user device to a mobile pick-up unit.

FIGS. 4-6 illustrate sequences of examples user interfaces that may be generated by the user interface module 230 of the companion application module 214 and presented for display on a mobile device of a user.

FIG. 4 illustrates example user interfaces 400, 402, and 404 which may be presented to a mobile device of a user when the mobile device of the user is within a predetermined distance of a mobile pick-up unit. FIG. 4 illustrates a landing page or user interface 400 within the companion application provided by the service provider 102 for the mobile pick-up unit 104. Interface 400 may display details about the item(s) for acquisition at the mobile pick-up unit 104. As shown at 406 in interface 402, the current items for acquisition for pick-up at the mobile pick-up unit are "Two 24 oz. USDA Prime Porterhouse Steaks." User interface 400 also includes an example image of the items, a cost (i.e., $20) of the items, a regular cost (i.e., $40) of the items, and a quantity limit (i.e., "Limit 1") of the items. Furthermore, interface 400 may include a "Buy Now" selection area 408. In some implementations, upon selection of area 408 a transition to another interface such a list view interface similar to interface 502 in FIG. 5 showing textual details associated with the remaining stops of the mobile pick-up unit 104.

Interface 400 includes arrow 410 for transitioning to user interface 402 to provide a map view including the predetermined locations associated with "Today's Stops" of the mobile pick-up unit. As shown on in FIG. 4, interface 402 may include a map view of a geographic area. The map view interface 402 may display a current location and future location of the pick-up unit for the time period (e.g., day). As shown, the interface 402 includes map markers 412(1) and 412(2) which indicates future locations of the pick-up unit. As described below with reference to FIG. 5, each of map markers 412(1) and 412(2) are selectable for providing further details (e.g., time of day, specific street address, a buy and pick-up at this location option, etc.) regarding the future location.

Furthermore, the map view interface 402 may display a user location indicator 414 indicating the current location of the mobile device of the user. As described above, location information associated with the mobile device of the user may be accessed by the location information module 228 of the service provider 102 to determine a current location of the mobile device of the user. In some implementations, the map view interface 402 may display an icon 416 indicating the current location of the mobile pick-up unit within the geographic area. Icon 416 is illustrated with multiple arms to indicate that the mobile device of the user (represented by user location indicator 414) displaying interface 402 is within a predetermined distance from the mobile pick-up unit. For instance, that the mobile device is within 30 yards of the mobile pick-up unit.

As described above, in some implementations, the location information module 228 of the companion application module 214 and the location module 222 of the pick-up unit module 212 may compare location information (e.g., GPS coordinates) of the mobile device of the user and the predetermined location information of the mobile pick-up unit, respectively, to determine whether the mobile device and the mobile pick-up unit are within a predetermined distance of each other. In other implementations, the location module 222 may set a perimeter of a predetermined radius around a predetermined location of the mobile pick-up unit while the location information module 228 of the companion application module 214 may determine that the mobile device is within the perimeter. In either event, when the mobile device of the user is within a predetermined distance from the mobile pick-up unit or within the perimeter around the mobile pick-up unit, icon 416 may be presented on the map view interface 402 to indicated the proximity of the mobile device (and the user) to the mobile pick-up unit.

In some implementations, the icon 416 may be selectable by the user of the mobile device. Furthermore, upon selection of icon 416, an interface 404 may be presented on the mobile device. Interface 404 may explicitly indicate that the mobile pick-up unit is nearby. In some implementations, the interface 404 may include a selection area 418 to allow the user to buy and pick up at the current location of the mobile pick-up unit. Upon selection of selection area 418, a confirmation user interface page may be presented to the user on the mobile device to complete the purchase of the item, in this example the "steaks," at the mobile pick-up unit.

As shown in FIG. 4, the interface 404 also includes an interactive control 420 to send a request to the service provider to initiate a visual, audible, and/or other sensory feature associated with the mobile pick-up unit. For instance, upon selection of the interactive control 420, the companion application module 214 may receive the request and communicate with the pick-up unit module 212 (or the unit status module 224) to cause an activation signal to be send to the mobile pick-up unit to cause activation of one or more of the auxiliary light(s) 312, auxiliary speaker(s) 314, and/or auxiliary function(s) 316. In this way, the selection of the interactive control 420 may appear to "poke" the mobile pick-up unit and provide a sensory feedback to the user of the mobile device that they are within a proximity of the mobile pick-up unit. While interactive control 420 is illustrated with the text "Don't Tap Me," any number of alternative implementations of the control 420 are envisioned with or without text. Furthermore, in other implementations, the control 420 may be any type on interactive control or icon presented on another interface (such as interface 402). For instance, the interactive control may be presented in a menu on an interface or appear as a button on an interface.

FIG. 5 illustrates another example sequence of user interfaces presented by the companion application when the mobile device of the user is within a predetermined distance of the mobile pick-up unit. This example sequence shows the user interfaces 402, 500, and 502 which may be presented on a mobile device of a user upon selection of features of the map view interface 402 described above with regard to FIG. 4.

FIG. 5 is illustrated as beginning with map view user interface 402 as described above. However, it is noted that landing page interface 400 is omitted from FIG. 5 to reduce redundancy. As described above, map view interface 402 includes map markers 412(1) and 412(2) which indicates future locations of the mobile pick-up unit. In some instances, each of map markers 412(1) and 412(2) are selectable for providing further details regarding the future locations.

User interface 500 provides an example user interfaces presented on a mobile device of the user upon the selection of map marker 412(1). As shown on interface 500, upon selection of map marker 412(1), a text box 504 may be presented above the map marker 412(1) to include a specific time the mobile pick-up unit will be at the future location. In addition, text box 504 may include the specific street address of the future location. In some implementations, upon selection of map marker 412(1) a selection box 506 may be presented on interface 502 to complete the purchase of the item or "buy & pick up here." In some implementations, a selection of area 506 may cause a transition to a confirmation user interface (not shown) to complete the purchase of the item.

User interface 500 (and map view interface 402) also includes a list view selection 508 to toggle between the map view and a list view interface 502. The list view interface 502 may include a textual list including information associated with the current location 510 and the future locations 512 and 514 of the mobile pick-up unit. As shown, the list view interface 502 includes a time frame that the mobile pick-up unit will remain at the current location 414, a neighborhood, and a street address of the current location. Furthermore, similar to selection area 506 described above, each of the list option in interface 502 may include a "buy & pick up here" selection area 518. As described above, selection of this area 518 may cause transition to a confirmation interface to confirm and complete the purchase of the item for pick-up at the corresponding location of the mobile pick-up unit.

In some implementations, list view interface 502 may include a map view selection 516 to toggle back to the map view interface 402 or 500.

FIG. 6 illustrates another example sequence of user interfaces presented by the companion application when the mobile device of the user is determined to move from outside a predetermined distance of the mobile pick-up unit to inside the predetermined distance of the pick-up unit. This example sequence shows the user interfaces 400, 600, 500, and 502 which may be presented on a mobile device of a user.

Landing page interface 400 may be presented on the mobile device of the user as described above with regard to FIG. 4. In some implementations, the landing page interface 40 may be presented on the mobile device regardless of whether the mobile device is outside or inside a predetermined distance of the pick-up unit. Similar to FIG. 4 described above, upon selection of arrow 410 a transition to another map view interface 600.

The map view interface 600 may display a user location indicator 602 to indicate a current location of the mobile device accessing the map view interface 600. Additionally, the map view interface 600 may include an icon 604 indicating the current location of the mobile pick-up unit within the geographic area. Icon 604 is illustrated without the multiple arms to indicate that the current location of the mobile device of the user (shown at user location indicator 602) displaying interface 600 is outside a predetermined distance from the mobile pick-up unit. For instance, that the mobile device may not be within 30 yards of the mobile pick-up unit.

In some implementations, upon selection icon 604, a text box 606 may be presented above the icon 604 to include a specific time the pick-up unit will remain at the current location. In addition, text box 606 may include the specific street address of the current location. In some implementations, upon selection of icon 604, a selection box 608 may be presented on interface 600 to enable the user to complete the purchase of the item or "buy & pick up here." In some implementations, a selection of area 608 may cause a transition to a confirmation user interface (not shown) to complete the purchase of the item.

FIG. 6 next illustrates interface 402 as described with reference to FIG. 4. However, at some point between the presentation of map view interface 600 and interface 402, the user has moved (as show by the change in position of the user location indicator 602 to the position of the user location indicator 414) within the predetermined distance to the mobile pick-up unit as indicated by change from icon 602 to icon 414. A transition from the icon 602 to the icon 414 may occur at any point when the mobile device of the user is detected within the predetermined distance from the mobile pick-up unit. For instance, the transition may occur on a single user interface such as map view interface 500 or as the user selects to navigated between two user interfaces such as between map view interface 600 and map view interface 500.

FIG. 6 also includes list view interface 502 as described above. In some implementations, the list view interface 502 may be presented to the user upon selection of the list view selection 508.

Example Process

Figure 7:
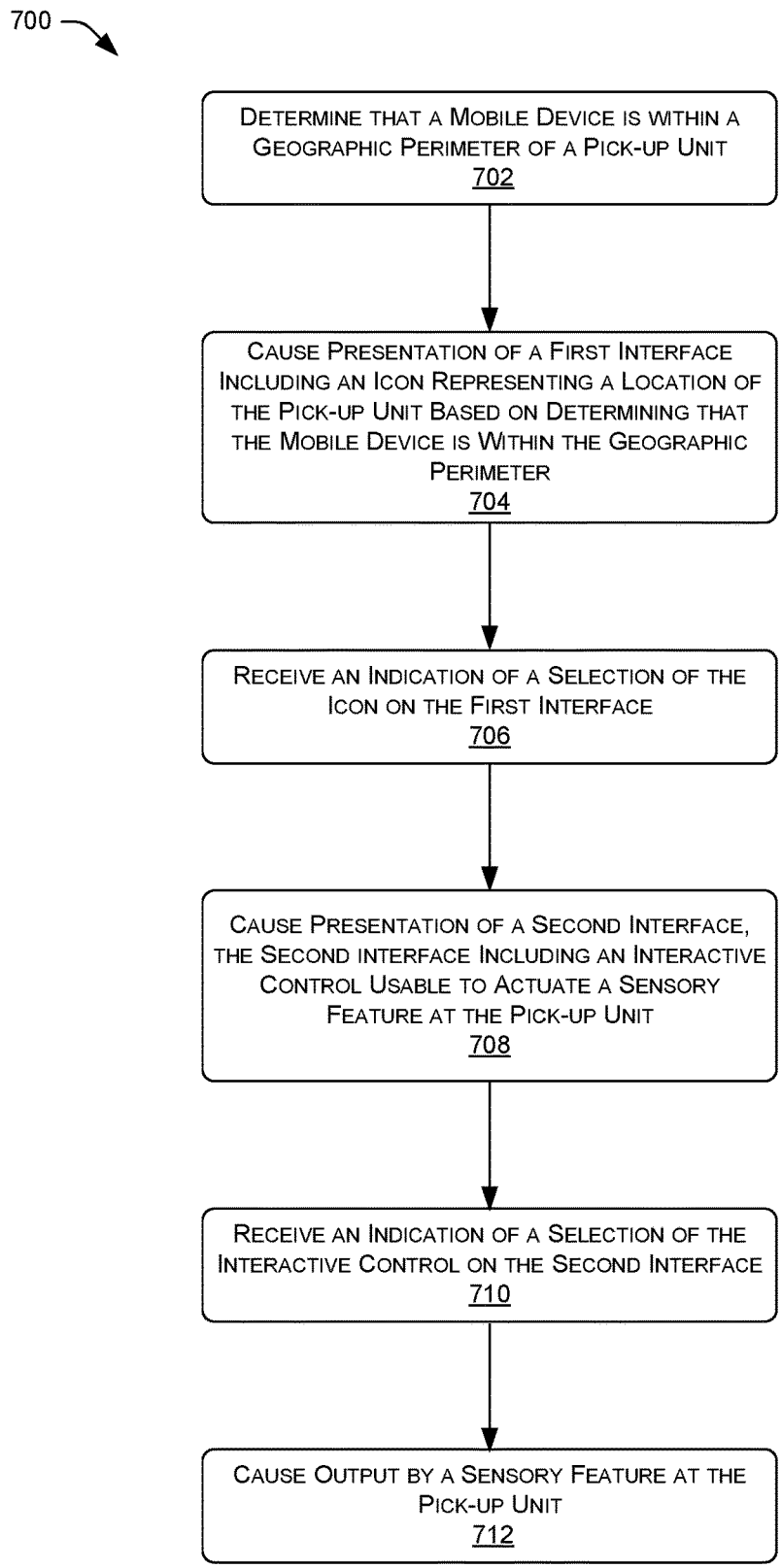
FIG. 7 illustrates an example process for causing an output by a sensory feature of a mobile pick-up unit.

FIG. 7 is a flow diagram of illustrative process for implementing the techniques described above of causing the mobile pick-up unit to output a light, sounds, or visual stimulus. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Furthermore, the processes are described with reference to the environment 100 and may be performed by the computing architecture 200 or mobile pick-up unit 104. Of course, the processes may be performed in other similar and/or different environments.

At 702, a service provider may determine that a mobile device associated with a user is within a geographic perimeter of a pick-up unit. For instance, the service provider may access location information associated with a mobile device to determine whether the location of the mobile device is within a threshold distance to a predetermined location of the pick-up unit.

At 704, the service provider may cause of a first interface on the mobile device. The first interface may include an icon representing the location of the pick-up unit based on based on determining that the mobile device is within the geographic perimeter. For instance, the icon may be presented on the first interface as shown in FIG. 6 at 416.

At 706, the service provide may receive an indication of a selection of the icon on the first interface. While, at 708, the service provide may cause presentation of a second interface including an interactive control usable to actuate a sensory feature at the pick-up unit. For instance, the second interface may be similar to interface 4040 shown in FIG. 4.

At 710, the service provider may receive a selection of an interactive control on the second interface. For instance, the service provider may receive an indication of a selection of interactive control 420 of interface 404.

At 712, the service provider may cause output by a sensory feature of the pick-up site. For instance, upon receiving selection of interactive control 420 of interface 404, the service provider may send an activation signal to the pick-up unit to cause an auxiliary lighting element to emit light, an auxiliary speaker to emit sounds, or other auxiliary machine to produce a sensory component.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   under control of one or more computing systems configured with specific executable instructions,
   determining that a mobile device is within a geographic perimeter of a vehicle, the vehicle moveable between multiple predetermined locations and including at least one item for acquisition;
   causing presentation of a first interface, the first interface including an icon representing a location of the vehicle based on determining that the mobile device is within the geographic perimeter;
   receiving an indication of a selection of the icon on the first interface;
   causing presentation of a second interface based at least in part on the selection of the icon, the second interface including an interactive control usable by a user of the mobile device to specify a particular sensory feature at the vehicle;
   receiving an indication of a selection of the interactive control on the second interface; and
   causing output by the particular sensory feature at the vehicle based at least in part on the selection of the interactive control.

2. The method as recited in claim 1, wherein the causing the output by the particular sensory feature at the vehicle comprises:
   transmitting a signal to the vehicle to cause the output by the particular sensory feature associated with the vehicle based at least in part the selection of the interactive control.

3. The method as recited in claim 1, wherein the particular sensory feature comprises at least one of an auxiliary light, an auxiliary speaker, a smoke machine, a bubble machine, or a motion machine.

4. The method as recited in claim 1, wherein the geographic perimeter is a radius around the vehicle, the vehicle having predetermined global positioning system (GPS) coordinates.

5. The method as recited in claim 4, wherein the radius around the vehicle is at least 15 yards and at most 50 yards.

6. The method as recited in claim 1, wherein determining that the mobile device is within the perimeter further comprises:
   determining global positioning system (GPS) coordinates of the mobile device; and
   determining that the GPS coordinates of the mobile device are within a predetermined distance of GPS coordinates of the location of the vehicle.

7. The method as recited in claim 1, wherein the particular sensory feature is specific to the at least one item for acquisition.

8. The method as recited in claim 1, wherein the selection of the location of the vehicle at which the at least one item is to be picked up is from among multiple available locations of the vehicle.

9. A system comprising:
one or more processors;
one or more computer-readable media storing computer-executable instructions that, when executed by the one or more processors, cause the one or more processors to perform acts comprising:
determining that a mobile device is within a geographic perimeter of a vehicle, the vehicle movable between multiple predetermined locations and including an item for acquisition;
causing presentation of a first interface, the first interface including an icon representing a location of the vehicle based on determining that the mobile device is within the geographic perimeter;
receiving, from the mobile device, an indication of a selection of the location of the vehicle at which the item is to be picked up, the selection of the location of the vehicle causing an acquisition of the item;
receiving an indication of a selection of the icon on the first interface;
causing presentation of a second interface based at least in part on the selection of the icon, the second interface including an interactive control usable by a user of the mobile device to specify a particular sensory feature at the vehicle;
receiving an indication of a selection of the interactive control on the second interface; and
causing output by the particular sensory feature at the vehicle based at least in part on the selection of the interactive control.

10. The system as recited in claim 9, wherein the causing the output by the particular sensory feature at the pick-up device comprises:
transmitting a signal to the vehicle to cause the output by the particular sensory feature associated with the vehicle based at least in part the selection of the interactive control.

11. The system as recited in claim 9, wherein the particular sensory feature comprises at least one of an auxiliary light, an auxiliary speaker, a smoke machine, a bubble machine, or a motion machine.

12. The system as recited in claim 9, wherein the geographic perimeter is a radius around the vehicle, the vehicle having predetermined global positioning system (GPS) coordinates.

13. The system as recited in claim 12, wherein the radius around the vehicle is at least 15 yards and at most 50 yards.

14. The system as recited in claim 9, wherein determining that the mobile device is within the perimeter further comprises:
determining global positioning system (GPS) coordinates of the mobile device; and
determining that the GPS coordinates of the mobile device are within a predetermined distance of GPS coordinates of the location of the vehicle.

15. The system as recited in claim 9, wherein the particular sensory feature is specific to the item.

16. The system as recited in claim 9, wherein the selection of the location of the vehicle at which the item is to be picked up is from among multiple available locations of the vehicle.

17. A system comprising:
one or more processors; and
one or more computer-readable media storing computer-executable instructions that, when executed by the one or more processors, cause the one or more processors to perform acts comprising:
determining that a mobile device is within a geographic perimeter of a vehicle, the vehicle moveable between multiple predetermined locations and including an item for acquisition;
causing presentation of a first interface, the first interface including an icon representing a location of the vehicle based on determining that the mobile device is within the geographic perimeter;
receiving an indication of a selection of the icon on the first interface;
causing presentation of a second interface based at least in part on the selection of the icon, the second interface including an interactive control usable by a user of the mobile device to specify a particular sensory feature at the vehicle;
receiving an indication of a selection of the interactive control on the second interface; and
causing output by the particular sensory feature at the vehicle based at least in part on the selection of the interactive control.

18. The system as recited in claim 17, wherein the causing the output by the particular sensory feature at the vehicle comprises:
transmitting a signal to the vehicle to cause the output by the particular sensory feature associated with the vehicle based at least in part the selection of the interactive control.

19. The system as recited in claim 17, wherein the particular sensory feature comprises at least one of an auxiliary light, an auxiliary speaker, a smoke machine, a bubble machine, or a motion machine.

20. The system as recited in claim 17, wherein the geographic perimeter is a radius around the vehicle, the vehicle having predetermined global positioning system (GPS) coordinates.

* * * * *